Jan. 2, 1934. J. L. MARTIN 1,942,252
DEVICE FOR KILLING FLIES AND OTHER INSECTS
Filed June 24, 1931
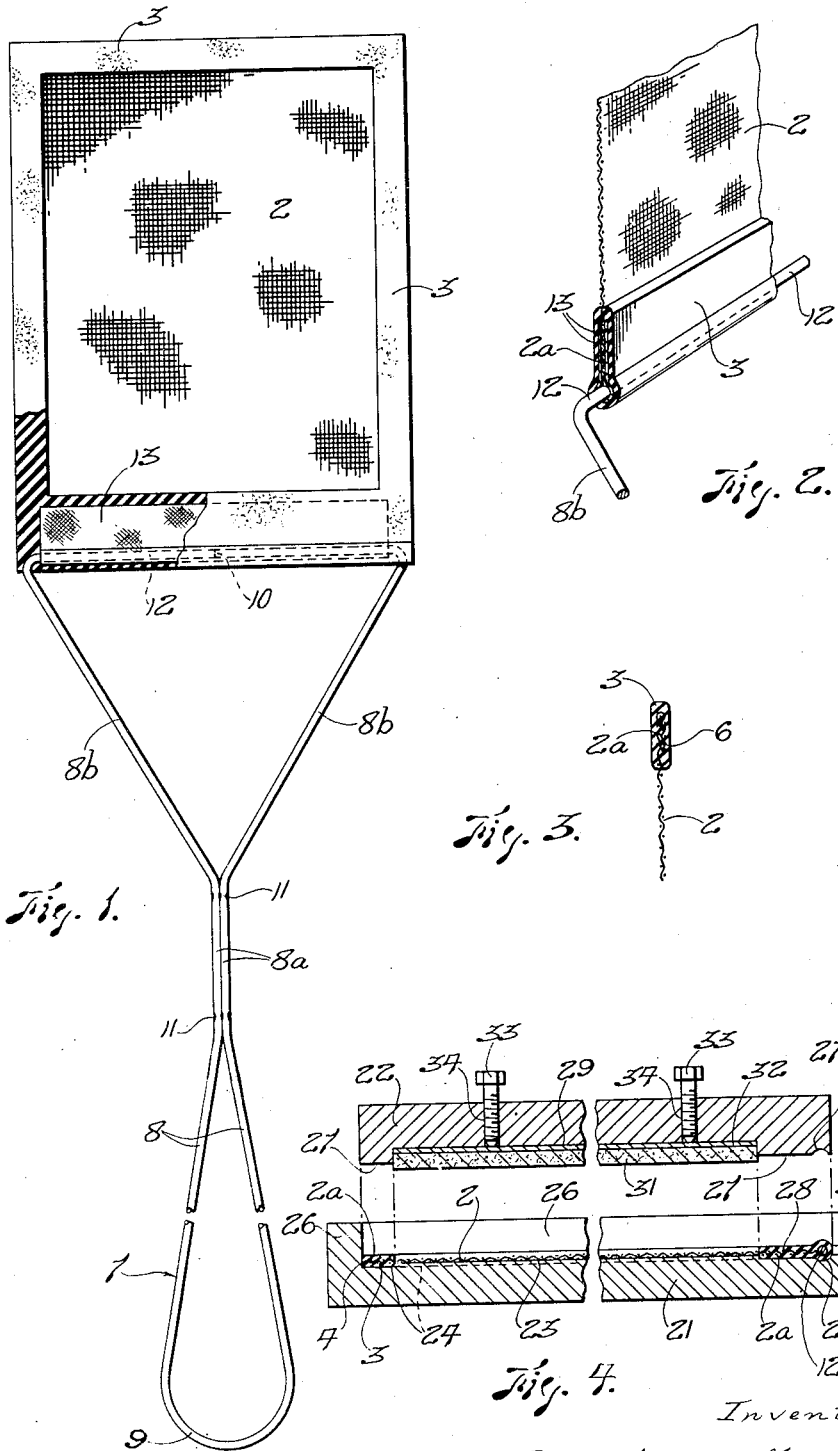

Patented Jan. 2, 1934

1,942,252

UNITED STATES PATENT OFFICE 1,942,252

DEVICE FOR KILLING FLIES AND OTHER INSECTS

James Leslie Martin, Thornbury, Victoria, Australia

Application June 24, 1931, Serial No. 546,568, and in Australia November 21, 1930

4 Claims. (Cl. 43—137)

This invention relates to insect killing devices of the well known kind generally termed "fly swatters" and comprising a flexible wire mesh striker connected to one end of a handle, whereby flies and other insects may be readily killed by hitting them with the striker.

At present the wire mesh strikers of such devices are usually provided along their marginal edges with a fabric or like binding or frame. One of the disadvantages of this construction is that after a comparatively short period of use the outer end portion of the striker becomes curled which reduces the effective area of the striker and renders the device inefficient. The edge binding or frame is also liable to fray and become loosened from the striker and weaken the connection with the handle which usually has sidewardly projecting portions accommodated within portions of the binding or frame.

One of the objects of the present invention is to overcome the aforesaid objections by the provision of an improved insect killing device in which the striker is to constructed that although of a flexible nature, it will always return to a substantially flat condition and thus permit of an effective swatting action.

The improved construction in addition to being simple and cheap satisfactorily reinforces the flexible striker and prevents it from fraying or tearing at the edges or from becoming detached or loosened from its handle even after the device has been in use for a comparatively lengthy period.

In accordance with this invention the marginal edge portions of the striker are embedded within an edge binding or frame of rubber which is applied by vulcanization. The handle of the device preferably has a cross bar or member at its inner end which extends adjacent the inner edge of the striker and is also embedded within the adjacent portion of the rubber binding or frame. Reinforcement may be incorporated within the rubber frame preferably adjacent the cross member of the handle and the local portion of the striker in order to ensure a strong and lasting yet flexible connection between the handle and the striker.

The invention also provides a method of and means for applying the rubber binding or frame to the striker in such manner as to ensure that the frame is of predetermined cross section and to prevent the rubber from spreading inwardly during vulcanization over and within the interstices of the main body or exposed portion of the striker.

In order that this invention may be better understood reference will now be made to the accompanying sheet of drawing which are to be taken as part of this specification and read herewith:—

Figure 1 shows an insect kiling device in accordance with this invention, parts thereof being broken away or shown in section for convenience of illustration.

Figure 2 is an enlarged fragmentary perspective in section of the rubber frame, the striker and the handle.

Figure 3 is an enlarged fragmentary section illustrating a modification.

Figure 4 shows in sectional elevation mould die members for use in applying the edge binding or frame to the striker.

According to the present invention the wire mesh striker 2 of an insect killing device is provided with an edge binding or frame 3 of rubber which extends around the edges of the striker and is vulcanized in position so that the marginal edge portions 2a of the striker become securely embedded within the rubber binding or frame.

In order to prevent any of the free ends 4 of the wires of the striker from projecting through the rubber frame 3 and to prevent the outer wires from becoming displaced during the vulcanizing treatment, the ends of the wires may be soldered by running a soldering iron around the edges of the striker prior to the application of the rubber frame. Or alternatively the blank of wire mesh may be cut slightly larger than required and the marginal edge portions thereof turned back as at 6 in Figure 3 upon the main portion of the striker. The turned back edge portions also have a reinforcing effect.

The striker is connected to a handle 7 which may be advantageously formed from a single length of wire shaped in such a manner as to have two arms 8 united by a bend 9 at their outer ends from which they converge towards the striker. The arms have contacting portions 8a intermediately of their length, spot welded or otherwise suitably united adjacent their ends as at 11. At a suitable distance from their inner ends the two arms 8 diverge sidewardly as at 8b until the distance between them is substantially equal to the width of the striker, the arms terminating in inturned portions which are welded or similarly united as at 10 to form a cross bar 12 at the inner end of the handle and adjacent the inner transverse edge of the striker. The cross bar is also embedded in the rubber binding or frame so that a secure connection of the striker to the handle is ensured.

Suitable reinforcement such as strip 13 of canvas or like fabric is preferably shaped to approximately U form and applied so as to embrace the cross bar 12 and the adjacent marginal edge portion of the striker before the rubber frame is applied. The reinforcement is thus incorporated in the frame and strengthens the connection between the striker and the handle. Similar reinforcement may extend completely around the striker if so desired.

A device incorporating the improvements will be found very efficient as the rubber edging or frame prevents the striker from becoming curled and ensures that it will return to a substantially flat condition immediately after use. The rubber frame also lengthens the effective life of the device and renders it more hygienic in that the striker may be readily washed without detriment thereto. The rubber frame may be coloured by incorporating colouring agents in the raw rubber in order to improve the appearance of the device.

The rubber frame is vulcanized around the striker with the aid of a mould or dies, and in order to prevent the rubber being exuded from the moulding space during vulcanization and spreading inwardly over and within the interstices of the main body of the striker the latter is, during the vulcanizing treatment, subjected to pressure between two surfaces one of which is preferably of an impressible nature so that it completely fills the interstices of the striker at least along the inner edges of the rubber frame. The result is that the inner edge as well as the other surfaces of the rubber frame are sharply defined, the appearance of the frame being thus exceedingly neat.

In applying the rubber frame I prefer to utilize two mould or die members such as 21, 22. One of the mould members 21 may be provided with a flat central face 23 forming a support for the wire striker 2. Extending around the face 23 is a depression or channel 24 into which the marginal edge portions 2a of the striker project, the channel constituting a portion of the moulding space for the rubber. A flange 26 outstands around the outer edge of the channel.

The other mould member 22 is provided with a projecting marginal flange or shoulder 27 complementary to the channel 24 in the mould member 21 and a sliding fit within the flange 26 so that when the mould members are brought together the unvulcanized rubber 28, which has been placed in the channel 24 in strips at both sides of the marginal portions 2a of the striker, will be compressed within the moulding space formed between the mould members.

The shoulder or flange 27 of mould member 22 surrounds a recess 29 accommodating a presser pad 31 preferably of vulcanized rubber or other resiliently impressible material which may be secured to a metal plate 32 and preferably projects outwardly beyond the flange 27. The outer edges of the pad 31 are complementary to the inner edges of the channel 24 so that by pressing the pad against the striker on the support 23 the moulding space is sealed along its inner edges so as to prevent the rubber exuding therefrom and spreading inwardly over the main body of the striker.

The mould members may obviously be pressed towards each other and heated by any suitable means to effect vulcanization.

The mould member 22 may be provided with screws 33 passing through screwed holes 34 and contacting with the back of the presser plate 32 so that additional pressure may be applied to the pad 31 to ensure that it completely fills the interstices of the striker 2 at least along the inner edges of the frame 3. It will be evident that a rubber or like pad may be disposed on the flat surface 23 of mould member 21 instead of or in addition to providing the pad 31.

The flange 26 of mould member 21 may be provided with open topped slots 36 for accommodating the end portions of the cross bar 12 where they merge into the portions 8b of arms 8 at the inner end of the handle, and the channel 24 and the flange 27 may be provided at appropriate positions with recesses 24a, 27a, which may be curved concentric with the cross bar.

Having now described my invention what I claim as new and desire to secure by Letters Patent is—

1. An insect killing device of the character described, comprising a wire mesh striker, a substantially U shaped in section reinforcement extending around and accommodating the marginal portions of a part of said striker, an edge frame of rubber within which said reinforcement and the marginal edge portions of said striker are embedded, and a handle for the device connected to the reinforcement.

2. An insect killing device comprising a handle, a transverse member at the inner end of the handle, a wire mesh striker having a transverse inner edge extending adjacent said transverse member, an edge frame of rubber within which said transverse member and the marginal edge portions of said striker are embedded, and a substantially U section strip of reinforcement which accommodates said transverse member and the adjacent transverse edge of the striker and is embedded within the respective portions of said rubber frame.

3. An insect killing device comprising a handle having a cross bar at its inner end, a wire mesh striker having an inner transverse edge of substantially the same width as said cross bar and extending adjacent thereto, and an edge frame of rubber secured by vulcanization to the marginal edge portions of said striker so that said cross bar and the marginal edge portions of the striker are embedded within said frame.

4. An insect killing device comprising a handle having at its inner end two transversely spaced side arms terminating in inturned coaligned transverse portions, a wire mesh striker having its inner transverse edge extending adjacent said inturned portions of said side arms, and an edge frame of rubber secured by vulcanization to the marginal edge portions of said striker so that said inturned portions of said side arms and said marginal portions of said striker are embedded within said rubber binding or frame.

JAMES LESLIE MARTIN.